US006433982B1

(12) United States Patent
Santos

(10) Patent No.: US 6,433,982 B1
(45) Date of Patent: Aug. 13, 2002

(54) CONNECTION VERIFYING TRIP UNIT

(75) Inventor: Esteban Santos, Farmington, CT (US)

(73) Assignee: General Electric Company, Shenectady, NY (US)

( * ) Notice: Subject to any disclaimer, the term of this patent is extended or adjusted under 35 U.S.C. 154(b) by 152 days.

(21) Appl. No.: 09/631,659

(22) Filed: Aug. 3, 2000

(51) Int. Cl.[7] .......................... H02H 3/00; G08B 21/00

(52) U.S. Cl. ...................... 361/93.2; 361/93.3; 340/649

(58) Field of Search .............................. 361/93.1, 93.2, 361/94, 93.3; 700/292, 293; 324/424; 340/514, 515, 649, 650, 3.1

(56) References Cited

U.S. PATENT DOCUMENTS 4,649,455 A * 3/1987 Scott .......................... 361/787
4,754,247 A 6/1988 Raymont et al.
4,870,531 A * 9/1989 Danek .......................... 335/18
6,141,197 A * 10/2000 Kim et al. ..................... 361/93
6,292,337 B1 * 9/2001 Legatti et al. ................ 361/46

* cited by examiner

*Primary Examiner*—Kim Huynh
(74) *Attorney, Agent, or Firm*—Cantor Colburn LLP

(57) ABSTRACT

A connection verifying trip unit includes a microprocessor circuit and a terminal electrically connected to the microprocessor circuit. A power source is electrically connected intermediate the terminal and the microprocessor circuit. The terminal is electrically connected to ground when the terminal is connected to the circuit breaker. When the terminal is disconnected from the circuit breaker, the terminal is disconnected from ground and the power source provides an input signal to the microprocessor circuit. In response to the input signal, the microprocessor unit provides an output signal indicating, locally or remotely, that the trip unit has been disconnected from the circuit breaker.

18 Claims, 4 Drawing Sheets

CONNECTION VERIFYING TRIP UNIT

BACKGROUND OF THE INVENTION

The present invention relates to electronic trip units for circuit breakers, and more particularly to a self-diagnostic check of a microprocessor-based electronic trip unit.

In electrical power distribution systems, circuit breakers have been used to terminate the flow of current in the event of a fault in the system. Traditionally, in circuit breaker applications, trip units have been thermally based or magnetically based, and perform well for their intended function, which will be appreciated by one of ordinary skill in the art. More recently, interest in microprocessor-based electronic trip units has grown. Circuit breaker trip units having microprocessor controls are being implemented in increasing numbers in power supply circuit breakers. These microprocessor-based trip units replace the traditional thermal and magnetic trip units to initiate automatic circuit interruption by the circuit breaker in response to electrical fault conditions. The popularity of microprocessor-based circuit breakers is largely due to their versatility. That is, a microprocessor-based trip unit provides convenient trip definition and setting adjustment that is precisely tailorable to a particular application.

Typically, the trip units are mounted within a recess in a circuit breaker enclosure or housing. Trip actuating and input/output (I/O) signals are transmitted between the trip unit and electronic devices within the circuit breaker through pin and socket connections between the trip unit and circuit breaker. Typically, these pin and socket connections are made at the bottom of the recess into which the trip unit is installed. Because the connection is made at the bottom of the recess, it is impossible for the technician to see if the connection is properly made. In other words, the interface between the trip unit and the circuit breaker is a "blind interface".

Typically, the current sensing devices within the circuit breaker sense current within the protected circuit. The sensed signal is provided by way of the pin and socket connection to the trip unit. The trip unit analyzes the sensed signal for one or more indications of fault within the protected circuit. Such indications include: time-delayed-over-current, instantaneous-over-current, over-voltage, under-voltage, over-frequency, under-frequency, over-power, volt-to-current-mismatch, etc. The list of potential fault indications is extensive and within the purview of those skilled in the art to select and design for a given application. If the trip unit detects one of these fault indications, the trip unit provides a trip signal by way of the pin and socket connections to a trip actuator within the circuit breaker. The trip actuator actuates an operating mechanism that causes a pair of main current carrying contacts within the circuit breaker to open, thus stopping the flow of electrical current in the protected portion of the distribution circuit.

A improper connection of any pin and socket could cause the trip unit to receive an erroneous sensed signal from the current sensors or to provide an erroneous signal to the trip actuator, thus increasing the frequency of nuisance trips. Such improper connections may be caused by not fully inserting the pins in the pin sockets or by misalignment of the pins with the pin sockets. Unfortunately, the improper installation of a pin and pin socket may not be detected until a nuisance trip occurs.

BRIEF SUMMARY OF THE INVENTION

In an embodiment of the present invention, a trip unit for electrically connecting to a circuit breaker includes a microprocessor circuit and a terminal electrically connected to the microprocessor circuit. A power source is electricaly connected intermediate the terminal and the microprocessor circuit. The terminal is electrically connected to ground when the terminal is connected to the circuit breaker.

When the terminal is disconnected from the circuit breaker, the terminal is disconnected from ground and the power source provides an input signal to the microprocessor circuit.

In response to the input signal, the microprocessor unit provides an output signal indicating that the trip unit has been disconnected from the circuit breaker.

DETAILED DESCRIPTION OF THE INVENTION

Figure 1:
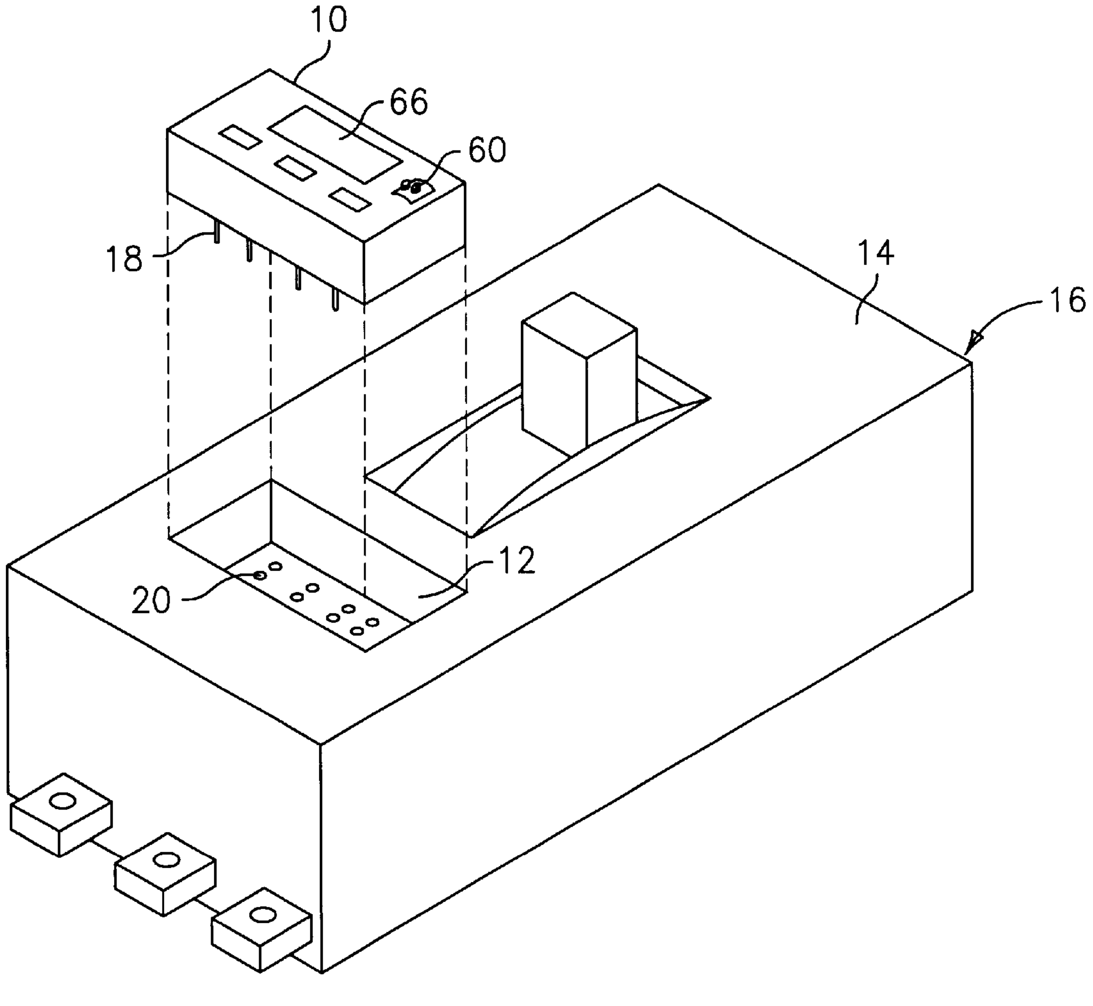
FIG. 1 is a partially exploded perspective view of a circuit breaker having a microprocessor-based trip unit of the invention.

Referring to FIG. 1, a typical microprocessor-based trip unit 10 mounts within a recess 12 of a housing 14 of a circuit breaker 16. When properly inserted, pins 18 extending from the bottom of trip unit 10 are received within sockets 20 disposed on the bottom of recess 12. While pins 18 and sockets 20 are shown, it will be recognized that any type of terminals(e.g., a contact type connection) can be used to electrically connect the trip unit 10 with the circuit breaker 16. Pins 18 and sockets 20 form an electrical connection between the trip unit 10 and circuit breaker 16, allowing control signals to be passed between the trip unit 10 and electronic components (not shown) within the circuit breaker 16. Such electronic components may include a trip actuator (solenoid) and current sensing devices, as is known in the art. The interface between the trip unit 10 and the circuit breaker 16 is a "blind" interface. In other words, a technician installing the trip unit 10 within the circuit breaker 16 cannot see the connection between pins 18 and sockets 20 to insure that they are properly connected.

Figure 2:
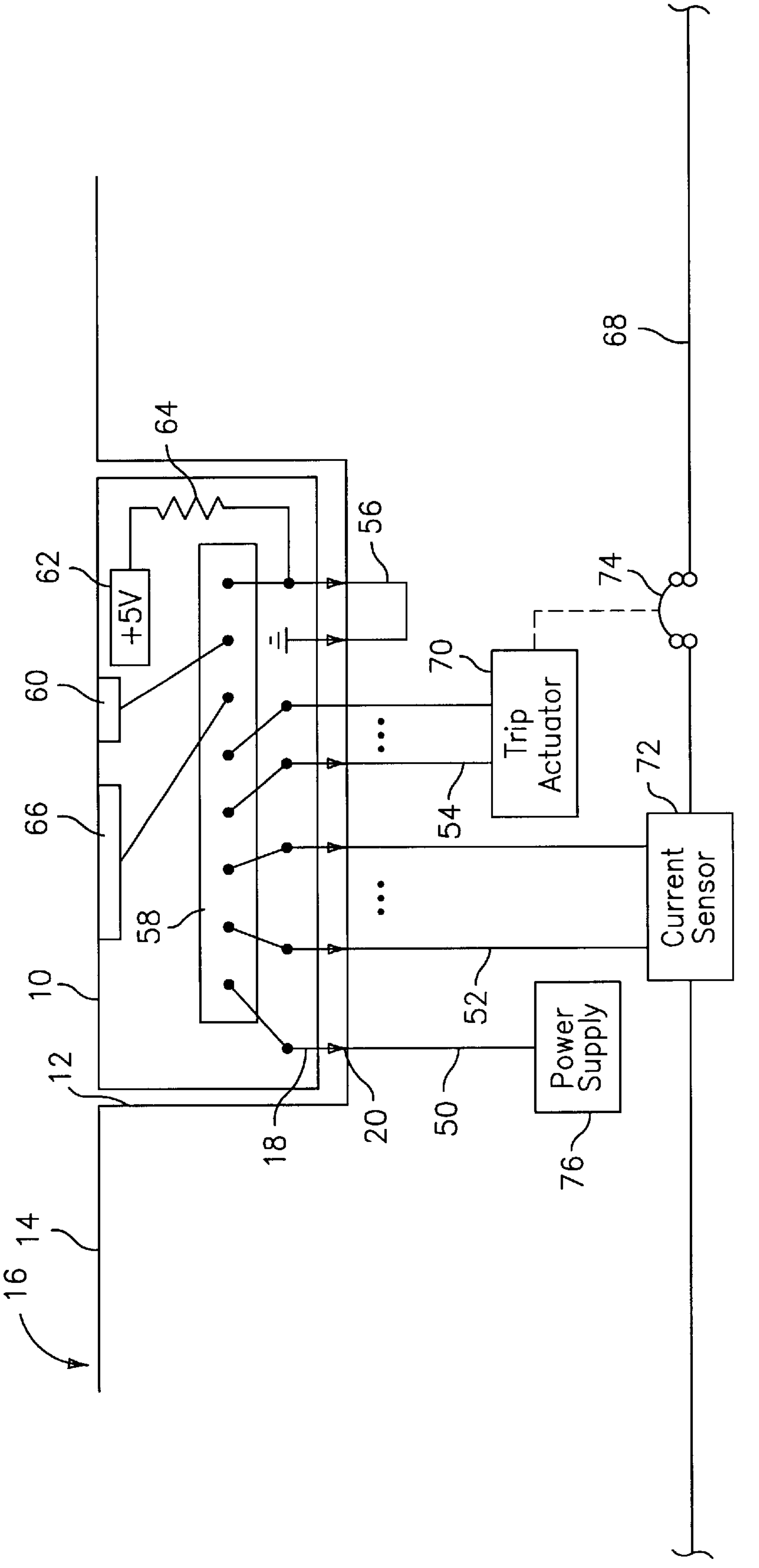
FIG. 2 is a schematic representation of the circuit breaker and trip unit of FIG. 1.

Referring to FIG. 2, a cross sectional view of the connection between the trip unit 10 and circuit breaker 16 is shown. Trip unit 10 is inserted within recess 12, with pins 18 extending within sockets 20. Sockets 20 are secured to the bottom of the recess 12 and are electrically connected to wires 50, 52, and 54, and to a jumper wire 56, which extend within the circuit breaker housing 14.

Housed within trip unit 10 is a circuit board including a microprocessor circuit 58. The microprocessor circuit 58 typically includes input units, logic circuits, and output units (not shown) to sense fault conditions and to provide a trip signal to the trip actuator 70 within the circuit breaker 16 if a fault condition is detected. The microprocessor circuit 58 is programmable and is capable of being adapted for use in different circuit breakers 16. The programming of such microprocessors is well known in the art. It will be appreciated that for the microprocessor to perform the required calculations, the proper signals must be received from the current sensing devices 72 at the designated pins 20 of the trip unit 10.

Commonly, there are three types of electrical signals that are transmitted and received between the circuit breaker 16 and the microprocessor circuit 58. First, signals representative of circuit parameters, such as voltage and current in the electrical distribution circuit 68, are supplied to the microprocessor circuit 58 from the current sensors 72 via wires 52. Second, output signals are transmitted from the microprocessor circuit 58 through wires 54 to the trip actuator 70 of the circuit breaker 16 to open the main contacts 74 within the circuit breaker 16 or to signal other protection devices (e.g. annunciator devices). Third, the power for the trip unit 10 is supplied by wires 50 from a power source 76, for example from batteries, or from a current transformer.

As is known in the art, microprocessor-based trip units 10 may include input/output (I/O) interfaces 60 for transmitting and receiving signals between the microprocessor circuit 58 and an external network. Such signals are typically used to provide voltage and current threshold values to the microprocessor circuit 58 or to provide data on the operating status of circuit breaker 16 to the external network. Trip unit 10 may also include visual indicators 66, such as light emitting diodes (LED) or liquid crystal diode (LCD) screens, for providing local indication of the circuit breaker 16 operating status.

Also housed within trip unit 10 is a power source 62, which is shown here as a 5 volt supply, and a resistor 64. Power source 62 is electrically connected to resistor 64, which is electrically connected to a point between one pin 20 and microprocessor circuit 58. Another pin 20 in trip unit 10 is connected to ground. Power source 62, resistor 64, microprocessor circuit 58, and jumper 56 form a circuit for continuity testing, as is best described with reference to FIG. 3.

Figure 3:
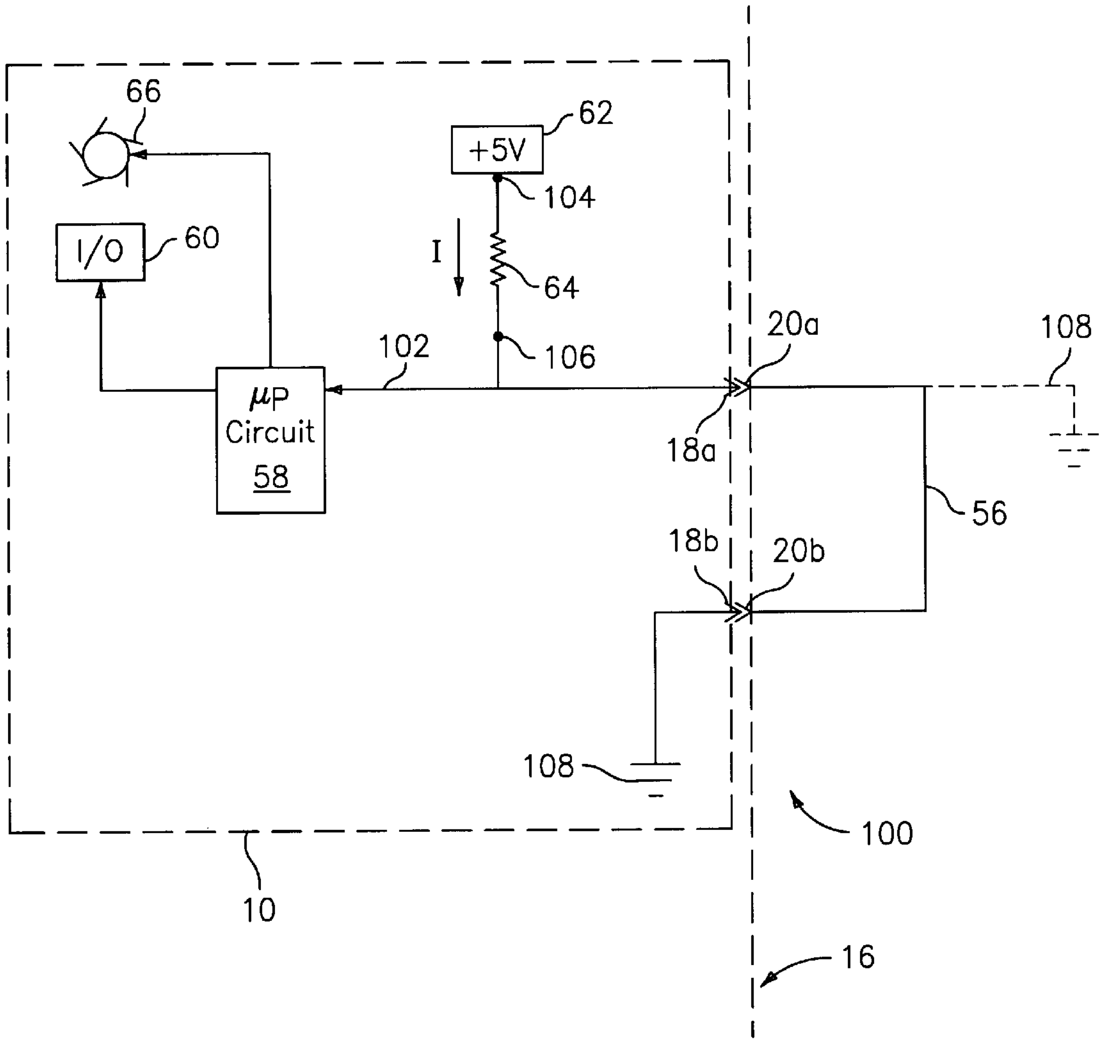
FIG. 3 is a schematic representation of an embodiment of the electrical test circuit of the present invention.
Figure 4:
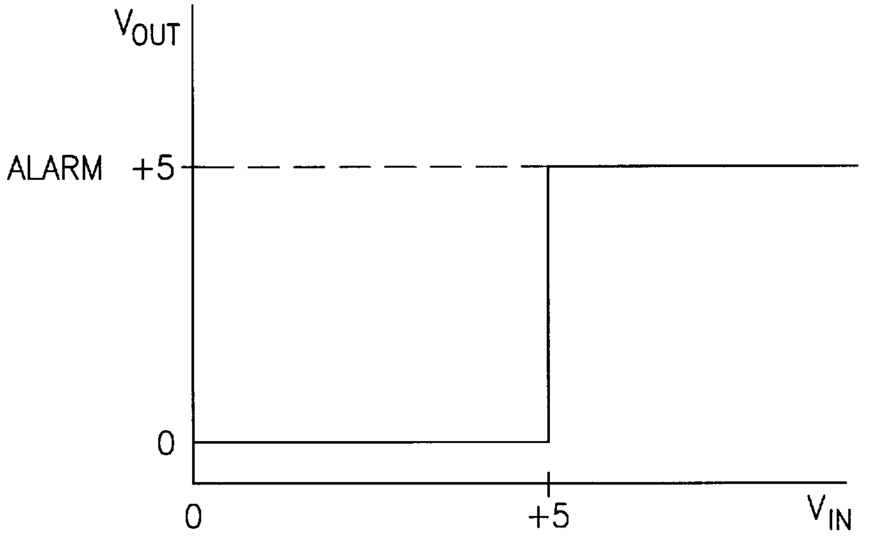
FIG. 4 is a graphical representation of the voltage characteristic of the microprocessor logic circuit.

Referring to FIG. 3, an embodiment of a circuit for continuity testing is shown generally at 100. The microprocessor circuit 58 includes a designated input 102. An internal logic circuit (FIG. 4) of the microprocessor 58 for the designated input 102 acts as an opened or closed switch as is well known in the microprocessor art. The logic circuit is closed when the voltage at input 102 is greater than or equal to +5 volts. The logic circuit is open when the input voltage is less than +5 volts indicating that the input 102 is connected to electrical ground, as described hereinafter. Typical set point values for the microprocessor 16 are 4.5 volts for closing the logic circuit and 1.0 volts for opening the logic circuit.

Typically, the trip unit firmware (not shown) will periodically check the input 102 for connection status. After sampling by the trip unit firmware, the output signal is provided to a visual indicator 66, or to a computer network via I/O interface 60. The visual indicator 66 maybe located on the trip unit 10, as shown in FIGS. 1,2, and 3, or it may be located a distance from trip unit 10.

Figure 5:
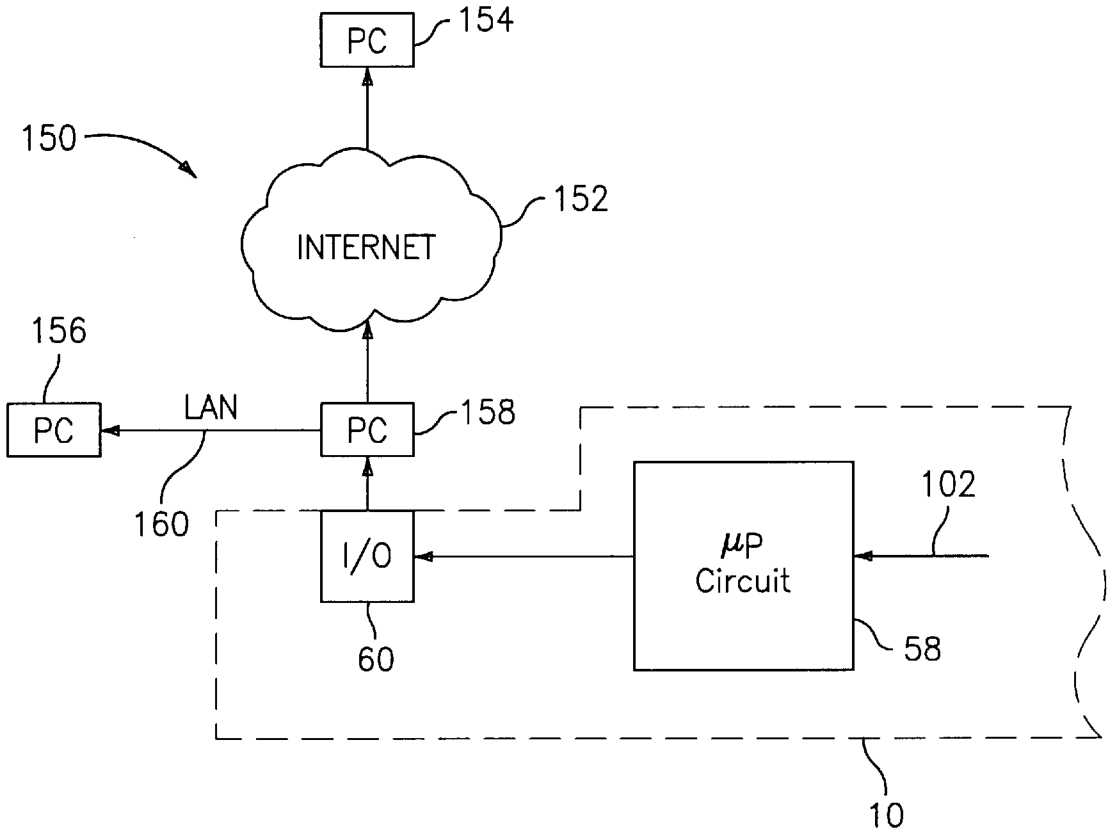
FIG. 5 is a schematic representation of a computer network connected to the trip unit of FIG. 1.

Referring to FIG. 5, the trip unit 10 is shown connected to a computer network 150 via I/O interface 60. Computer network 150 includes a plurality of client personal computers (PCs) 154 and 156, connected to a host PC via the Internet 152 and a local-area network (LAN) 160. PC 158 is configured to execute a program, such as General Electric Company's Power Management Control System software, that allows PC 158 to send and receive data between itself and I/O interface 60 of trip unit 10, and allows PC 158 to display this data in graphical form on a monitor (not shown) attached to PC 158. PCs 154 and 156 are configured to execute programs, such as General Electric Company's Power Management Control System software, that allows PCs 154 and 156 to access the data from PC 158 and display the data in a graphical user interface on monitors (not shown) connected to PCs 154 and 156. Computer network 150 allows users to detect the incorrect installation of trip unit 10 from remote locations.

Referring again to FIG. 3, power supply 62 is coupled to resistor 64 at a first end 104 of the resistor 64. The resistor 64 is coupled to input 102 at a second end 106 of the resistor 64. The power supply 62 is a source of direct current and is supplied at a substantially constant +5 volts. Typical sources of +5 volt direct current power include batteries and rectified alternating current. Such power supplies are well known in the art.

The resistor 64 is preferably of a substantially high resistance, on the order of about 10,000 ohms, to prevent drainage of the power supply 62. Such resistors are well known in the art and generally readily commercially available.

When trip unit 10 is mounted on circuit breaker 16, socket 20a receives a pin 18*a*, which is connected to input 102 of the microprocessor circuit 58. A jumper wire 56 is interposed between the socket 20*a*and a socket 20*b*. Socket 20*b* receives a pin 18*b*, which is electrically connected to ground 108. In an alternative embodiment, jumper 56, pin 18*b*, and socket 20*b*are eliminated and socket 20*b* is connected directly to ground 108, as is shown in phantom.

Now referring to both FIGS. 2 and 3, operation of the proper connection verifying trip unit can be described. When the trip unit 10 is properly mounted on the circuit breaker 16, the pin 18a is electrically connected to the socket 20*a* and the pin 18*b* is electrically connected to the socket 20*b*. The connection will result in an electrical connection from the power supply 62 to the electrical ground 108 only when the pins 18 are correctly inserted in the sockets 20. When the +5 volts from the power supply 62 is coupled to the electrical ground 108, the +5 volts is dropped through the resistor 64 to a very low value, substantially 0 volts. A trickle current, I, having a very low value, perhaps on the order of 0.5 ma, flows from the power supply 62 through the resistor 64 through the jumper wire 56 and then to the electrical ground 108. The microprocessor circuit 58 detects the near-zero-voltage state at 102 and transmits a signal indicating that the trip unit 10 is properly connected to the circuit breaker 16.

If the pins 18 are not correctly inserted into the sockets 20, then the trip unit 10 is not properly installed. The power supply 62 will not be electrically connected to the electrical ground 108, resulting in a voltage signal of +5 volts applied at the input 102. The microprocessor circuit 58 detects a +5 volt state and transmits a signal indicating that the trip unit 10 is not properly installed. As described hereinbefore the output signal may be transmitted to the visual display 66 or to the computer network 150 (FIG. 5) via I/O interface 60.

The trip unit of the present invention insures the proper installation of the trip unit by providing indication, locally or remotely, when improper installation occurs. Because proper installation of the trip unit is insured, the trip unit of the present invention will help to insure the correct operation of the circuit breaker and reduce the number of nuisance trips that the circuit breaker is subjected to.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A connection verifying trip unit for a circuit breaker, the connection verifying trip unit comprising:

a microprocessor circuit;

a terminal electrically connected to said microprocessor circuit;

a power source electrically connected intermediate said terminal and said microprocessor circuit; and wherein said terminal is electrically connected to ground when said terminal is connected to the circuit breaker, and said terminal is disconnected from ground when said terminal is disconnected from the circuit breaker.

2. The connection verifying trip unit of claim 1, further comprising:

a resistor electrically connected intermediate said terminal and said power source.

3. The connection verifying trip unit of claim 1, further comprising:

a visual indicator configured to receive a signal from said microprocessor circuit when said terminal is disconnected from said circuit breaker.

4. The connection verifying trip unit of claim 1, further comprising:

an I/O interface configured to connect to a computer network, the microprocessor circuit being configured to provide a signal to said computer network via said I/O interface when said terminal is disconnected from said circuit breaker.

5. The connection verifying trip unit of claim 4, wherein said computer network includes the Internet.

6. The connection verifying trip unit of claim 1, wherein said power source is greater than or equal to +5 volts.

7. The connection verifying trip unit of claim 2, wherein said resistor has a resistance value greater than or equal to about 10,000 ohms.

8. An electric circuit breaker comprising:

a first terminal;

a trip unit including a second terminal electrically connected to said first terminal, said trip unit further including a microprocessor circuit, said second terminal electrically connected to said microprocessor circuit, and a power source electrically connected intermediate said second terminal and said microprocessor circuit; and wherein said second terminal is electrically connected to ground when said second terminal is connected to the circuit breaker, and said second terminal is disconnected from ground when said second terminal is disconnected from the circuit breaker.

9. The circuit breaker of claim 8, wherein said trip unit further includes:

a resistor electrically connected intermediate said second terminal and said power source.

10. The circuit breaker of claim 8, wherein said trip unit further includes:

a visual indicator configured to receive a signal from said microprocessor circuit when said terminal is disconnected from said circuit breaker.

11. The circuit breaker of claim 8, wherein said trip unit further includes:

an I/O interface configured to connect to a computer network, the microprocessor circuit being configured to provide a signal to said computer network via said I/O interface when said second terminal is disconnected from said circuit breaker.

12. The circuit breaker of claim 11, wherein said computer network includes the Internet.

13. The circuit breaker of claim 8, wherein said power source is greater than or equal to +5 volts.

14. The circuit breaker of claim 9, wherein said resistor has a resistance value greater than or equal to about 10,000 ohms.

15. The circuit breaker of claim 8, further including a third terminal electrically connected to said first terminal, and wherein said trip unit further includes a fourth terminal electrically connected to said third terminal and to ground.

16. The circuit breaker of claim 8, wherein said first terminal is electrically connected to ground.

17. The circuit breaker of claim 8, further including:

a circuit breaker housing, said first terminal disposed on said circuit breaker housing.

18. The circuit breaker of claim 17, wherein said circuit breaker housing includes a recess formed therein, said first terminal disposed in said recess and said recess configured to accept said trip unit.

* * * * *